(12) United States Patent
Casey et al.

(10) Patent No.: US 8,773,084 B2
(45) Date of Patent: Jul. 8, 2014

(54) BUCK-BOOST CONVERTER USING TIMERS FOR MODE TRANSITION CONTROL

(75) Inventors: Charles A. Casey, Doylestown, PA (US); David Dearn, Hankerton (GB)

(73) Assignee: Micrel, Inc., San Jose, CA (US)

( * ) Notice: Subject to any disclaimer, the term of this patent is extended or adjusted under 35 U.S.C. 154(b) by 53 days.

(21) Appl. No.: 13/277,559

(22) Filed: Oct. 20, 2011

(65) Prior Publication Data

US 2012/0032658 A1 Feb. 9, 2012

Related U.S. Application Data

(63) Continuation-in-part of application No. 12/546,602, filed on Aug. 24, 2009, now Pat. No. 8,436,591.

(51) Int. Cl.
*G05F 1/24* (2006.01)
*G05F 3/16* (2006.01)

(52) U.S. Cl.
USPC ............................................ 323/259; 323/225

(58) Field of Classification Search
USPC .......... 323/225, 271, 259, 282, 283, 284, 285
See application file for complete search history.

(56) References Cited

U.S. PATENT DOCUMENTS

| | | | |
|---|---|---|---|
| 7,432,689 B2 * | 10/2008 | Miller et al. | 323/259 |
| 2009/0045786 A1 | 2/2009 | Krellner et al. | |
| 2010/0244801 A1 * | 9/2010 | Arora et al. | 323/284 |
| 2011/0043172 A1 * | 2/2011 | Dearn | 323/259 |

* cited by examiner

*Primary Examiner* — Matthew Nguyen
*Assistant Examiner* — Trinh Dang
(74) *Attorney, Agent, or Firm* — Van Pelt, Yi & James LLP

(57) ABSTRACT

A DC-to-DC, buck-boost voltage converter includes a duty cycle controller configured to generate control signals for a buck driver configured to drive first and second buck switching transistors at a buck duty cycle and to generate control signals for a boost driver configured to drive first and second boost switching transistors at a boost duty cycle. The duty cycle controller includes at least a duty cycle timer and an offset timer where the duty cycle controller applies the duty cycle timer and the offset timer to control transitions between the buck, the buck-boost and the boost operation modes of the voltage converter.

14 Claims, 6 Drawing Sheets

BUCK-BOOST CONVERTER USING TIMERS FOR MODE TRANSITION CONTROL

CROSS-REFERENCE TO RELATED APPLICATION

This application is a continuation-in-part of application Ser. No. 12/546,602, filed on Aug. 24, 2009, entitled "Buck-Boost Converter With Smooth Transitions Between Modes" of David Dearn, which application is incorporated herein by reference in its entirety.

FIELD OF THE INVENTION

The invention relates to switching regulators and, in particular, to a buck-boost converter using timer to realize smooth transitioning between operation modes.

DESCRIPTION OF THE RELATED ART

Switch mode power supplies or switching regulators, also referred to as DC-to-DC converters, are often used to convert an input supply voltage to a desired output voltage. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit. A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck boost switching regulator, or "buck boost converter," provides both step-up and step-down functions.

More specifically, a buck-boost voltage converter receives an unregulated input voltage and generates an increased or decreased regulated output voltage, where the target output voltage is set by component values in a feedback circuit. A common regulating technique for a buck-boost converter is pulse width modulation (PWM) where the switching duty cycle of either the buck power switches or the boost power switches control the output voltage. The switching of the power switches causes current to build up at an output inductor or causes current to be discharged from the output inductor to an output capacitor. In fixed frequency operation, the power switches are turned on and off at a fixed switching frequency, but at an adjusted duty cycle, so that the average current equals the load current at the desired regulated output voltage. PWM regulators may also be implemented using a variable switching frequency control.

In a buck-boost converter that either steps down or steps up the input voltage, the comparative voltage values of the input voltage and the output voltage determine which operation mode the converter should operate in. For instance, when the input voltage is greater than the output voltage, the buck-boost converter is operated in the Buck mode to step down the input voltage. When the input voltage is about the same as the output voltage, the buck-boost converter is operated in the Buck-Boost mode to regulate the output voltage. Finally, when the input voltage is less than the output voltage, the buck-boost converter is operated in the Boost mode to step up the input voltage.

A fundamental problem of the buck-boost converter is to determine the appropriate converter behavior when the converter is crossing between the Buck and Buck-Boost operation modes and also between the Buck-Boost and the Boost operation modes in either direction. For example when moving between the Buck and Buck-Boost modes, when the maximum Buck duty cycle has been reached, then a minimum Boost cycle has to be inserted while also reducing the Buck cycle by an appropriate amount. Similarly when moving between the Buck-Boost and Boost modes, the Buck duty cycle has to be increased, while appropriately reducing the Boost pulse. Of course, the appropriate pulses widths must also be determined when these operation mode transition sequences are reversed.

To ensure robust operation, buck-boost converters should be designed to prevent "chattering" between operations modes when the input and output voltages remain unchanged. Also, buck-boost converters should be designed to prevent transient jumping between operation modes. The problems that can occur during the transition between different operation modes in a conventional buck-boost converter are described with reference to FIG. 1.

FIG. 1 is a schematic diagram of a conventional buck-boost converter. Referring to FIG. 1, a single inductor buck-boost converter 10 includes four power switches arranged in a bridge configuration. Power switches S1 and S2 form a first pair of switches and are referred to as the buck switches, while power switches S3 and S4 form a second pair of power switches and are referred to as the boost switches. Switch S2 is sometimes referred to as a "buck recirculating switch" or "recirculating switch." Power switches S1 and S2 are mutually exclusive in operation. That is, when switch S1 is on, switch S2 is off and vice versa. Power switches S3 and S4 are also mutually exclusive in operation. When switch S3 is on, switch S4 is off and vice versa.

An output inductor L1 is connected between the two pairs of power switches, that is, between nodes 22 and 24. The switching of the power switches S1 to S4 causes a ramping current to flow in inductor L1. An output capacitor C1 filters the ramping inductor current to generate a substantially constant output voltage Vout at an output node 26. For the case of fixed frequency operation, the proportion of time for which switch S1 is closed is called the buck duty cycle, and the proportion of time for which switch S3 is closed is called the boost duty cycle. The duty cycles for the buck and boost switch pairs are controlled independently to maintain a constant output voltage Vout for a given input voltage Vin.

Regulation of the output voltage is realized through a voltage divider formed by resistors R1 and R2 which generates a stepped down output voltage as the feedback voltage $V_{FB}$ (node 29). The feedback voltage $V_{FB}$ is compared with a reference voltage $V_{REF}$ (node 30) at an error amplifier 20. The error amplifier 20 generates an error voltage $V_{ERR}$ (node 32) indicative of the difference between the feedback voltage and the reference voltage. The error voltage $V_{ERR}$ is provided to a PWM controller 12 to generate the appropriate duty cycle for the buck power switches and the boost power switches. The PWM controller 12 generates buck drive signals for the buck driver 16 driving the buck switches S1, S2 and generates boost drive signals for the boost driver 18 driving the boost switches S3, S4.

The operation of the conventional buck-boost converter 10 will now be described. Assuming that the input voltage Vin is a slowly falling input voltage, such as a voltage supplied by a battery, and a fixed output voltage is selected, the buck-boost converter 10 operates in the Buck mode when the input voltage is higher than the desired output voltage. In the Buck mode, switches S1 and S2 switches according to the Buck duty cycle while switch S3 is open and switch S4 is closed.

As the input voltage Vin falls due to the battery depleting, switch S1 is on for a longer and longer proportion of each cycle, and switch S2 is on for less and less of each cycle. At some point, switch S1 can no longer turn off fully at the end of each cycle and switch S2 can no longer turn on fully. If no action was taken, the fixed frequency repetitive nature of the converter operation would be broken, and a series of pulses would ensue, where switch S1 would be on for 100% of some cycles and less than 100% for others. This non-repetitive nature in the buck mode, at a time when the input voltage falls to a level approximately equals the output voltage, would cause the inductor current and output voltage ripple to undesirably increase if no remedial measure is taken.

A Buck-Boost mode is an operation mode which is commonly used when the output voltage Vout is close to the input voltage Vin. In this mode, all four switches S1-S4 operate as two independently controlled pairs of mutually exclusive switches. In the Buck-Boost mode, it is the relative time between switches S3 and S2 being on that causes the inductor current (and hence the output voltage) to increase or decrease over a whole cycle.

In the Boost mode, switch S1 is closed and switch S2 is open. As the input voltage Vin falls below the fixed output voltage, switch S3 is turned on for longer proportions of the switching period and hence switch S4 comes on for shorter proportions of the switching period. In a similar way to the Buck mode, the Boost mode is limited by the minimum time for which switch S3 can turn off. If the input to output voltage ratio then demands a longer on time for switch S3, then a repetitive fixed frequency operation would be broken and switch S3 would be completely off for some periods and on for others, and the inductor current and output voltage ripple would undesirably increase.

Theoretically, it would seem that with a combination of buck mode, buck-boost mode, and boost mode, any combination of input and output voltages can be accommodated and a fixed frequency repetitive operation could be maintained. However, in reality, the operation of the conventional buck-boost converters is such that transitions between different operation modes result in small glitches in the output voltage Vout due to the lack of a constant, repetitive, fixed frequency operation of the converter. The generation of the undesired glitch on the output voltage Vout will now be descried with reference to FIGS. 1 and 2. FIG. 2 illustrates the inductor current waveforms in the Buck Mode and the Buck-Boost Mode for the buck-boost converter of FIG. 1.

Assuming the buck-boost converter 10 initially operate with an input voltage Vin much higher than the output voltage Vout, the buck-boost converter 10 is then operating in buck mode. Then, the input voltage Vin decreases while the converter attempts to maintain a constant output voltage Vout. In the Buck mode, the rate of increase of the inductor current in one cycle is related to the input voltage Vin minus the output voltage Vout, while the rate of decay of the inductor current is proportional to the output voltage Vout. For stable operation, the inductor current decays to the same level at the end of a cycle as the level at the start of the cycle, as shown by curve 40 in FIG. 2.

Referring to FIG. 2, in the Buck mode (curve 40), the slope of the rising segment of the inductor current is given as (Vin-Vout)/L, where L is the inductance of inductor L1. The slope of the decaying segment of the inductor current is given as Vout/L. The voltage across the inductor L1 is related to a given combination of switches being turned on or closed. For instance, the voltage Vin across the inductor L1 corresponds to switches S1 and S3 being on. The voltage Vin-Vout across the inductor L1 corresponds to switches S1 and S4 being on. And the voltage Vout across the inductor L1 corresponds to switches S2 and S4 being on.

This stable Buck mode operation (curve 40) reaches the mode transition limit when the turn off time of switch S1 cannot be reduced any further. Then, if the input voltage Vin drops still further, the buck-boost converter 10 would want to go into the Buck-Boost mode. The transition into the Buck-Boost mode occurs when the input voltage Vin is slightly greater than the output voltage Vout because there is a small voltage drop in the converter.

Curve 42 in FIG. 2 illustrates the inductor current waveform when the converter transitions into the Buck-Boost mode by introducing a minimum boost pulse at the start of each buck-boost cycle. At the start of the Buck-Boost mode, when the input voltage has fallen to slightly greater than the output voltage, the Buck mode continues to operate at its maximum duty cycle, so switch S2 turns on for a minimum on-time at the end of each cycle. Also, at the start of the Buck-Boost mode, the boost switch S3 turns on for the minimum on-time for the minimum boost duty cycle.

Because of the minimum boost pulse, the minimum turn on-time of switch S3 is too small to create the slight boost needed to regulate the output voltage. Consequently, the inductor current cannot return to the starting current level at the end of the switching cycle, as shown in FIG. 2. As a result, the voltage control loop would cause the control signal in the converter to oscillate, choosing some buck cycles and some buck-boost cycles for switching, in order to try to make the output voltage Vout to be the desired regulated voltage. For instance, when the output voltage Vout becomes too high and the error voltage $V_{ERR}$ in the feedback loop reduces to a given level, the Buck mode would then be initiated in an attempt to lower the output voltage Vout to the desired level. Then, the Buck-Boost mode is initiated after the output voltage Vout falls too low. This oscillating behavior between two operation modes is undesirable but is seen on many of the converter devices commercially available today.

When the input voltage Vin falls further, while the converter 10 attempts to maintain a constant output voltage Vout, the inductor current will fall more rapidly, but rise more slowly, at least during the Vin-Vout portion. Eventually the inductor current will be able to fall to the same level at which it started the cycle, and stable buck-boost operation is realized.

As the input voltage Vin drops further, the value of (Vin-Vout) will become negative, that is voltage Vin is less than voltage Vout, and finally the converter reaches a point where it needs to enter the Boost mode. In the Boost mode, the buck recirculation period (the Vout/L inductor current segment) is removed by keeping switch S2 open or off When the converter is at the border of transitioning between the Buck-Boost mode and the Boost mode, removing the buck recirculation period would once again result in the inductor current not being able to return at the end of a cycle to the current level where it started the cycle. This would result in the output voltage and the control loop jumping between the Buck-Boost and the Boost mode in order to maintain the same average voltage. Eventually, with the input voltage Vin falling still further, a stable Boost mode operation would be realized.

Conventional buck-boost converters suffer many shortcomings, particularly in the chattering between operation modes and also in transient jumping between the operation modes. Conventional buck-boost converters are not able to realize smooth transitions into and out of the Buck-Boost mode.

SUMMARY OF THE INVENTION

According to one embodiment of the present invention, a DC-to-DC, buck-boost voltage converter including a first buck switching transistor coupled between an input voltage and a first terminal of an inductor, a second buck switching transistor coupled between the first terminal of the inductor and ground, a first boost switching transistor coupled between a second terminal of the inductor and ground, and a second boost switching transistor coupled between the second terminal of the inductor and an output terminal of the converter where the converter includes a duty cycle controller configured to generate control signals for a buck driver configured to drive the first and second buck switching transistors at a buck duty cycle and to generate control signals for a boost driver configured to drive the first and second boost switching transistors at a boost duty cycle. The duty cycle controller includes at least a duty cycle timer and an offset timer where the duty cycle controller applies the duty cycle timer and the offset timer to control transitions between the buck, the buck-boost and the boost operation modes of the voltage converter.

The present invention is better understood upon consideration of the detailed description below and the accompanying drawings.

DETAILED DESCRIPTION OF THE PREFERRED EMBODIMENTS

In accordance with the principles of the present invention, a buck-boost converter incorporates a duty cycle controller using timers to control the transition between Buck, Buck-Boost and Boost modes. More specifically, the timers in the duty cycle controller measure the duty cycle of the buck and boost power switches to determine the transition between the different operation modes. In embodiments of the present invention, a duty cycle timer and an offset timer are used to establish the transition thresholds between the operation modes. Furthermore, in some embodiments, hysteresis is implemented using the offset timer to prevent chattering or transient jumping between the operation modes.

When a buck-boost converter crosses over the boundary of different operation modes, the duty cycle of the converter must be well controlled in order to avoid chaotic or unwanted behavior. According to embodiments of the present invention, the duty cycle controller in the buck-boost converter of the present invention is configured to use timers to control the duty cycle. The duty cycle controller using timers is silicon area efficient and is also effective to minimize the buck-boost region when the converter is operated at different frequencies.

Furthermore, in conventional buck-boost converters, when the switching frequency decreases, the transition times between different operation modes increases and the converter may operate in the buck-boost mode for longer than desired to be efficient. According to embodiments of the present invention, the timers in the duty cycle controller of the present invention operate independently of the switching frequency so that the mode transition times are independent but synchronous of the switching frequency. As a result, the duty cycle controller with timers is able to achieve the smallest possible buck-boost operation time independent of the switching frequency to achieve optimal converter operation.

In one embodiment, the timers are generated from the main oscillator or the system clock of the electronic device in which the buck-boost converter is incorporated. Improved duty cycle accuracy is assured by using a copy of the oscillator current which is often trimmed for accuracy. In other embodiments, the timers may be generated from a clock internal to the buck-boost converter where the clock may run faster than the maximum switching frequency. Also, in some embodiments, a phase-locked loop may be used to generate the high clock frequencies using a clock signal external or internal to the buck-boost converter.

Figure 3:
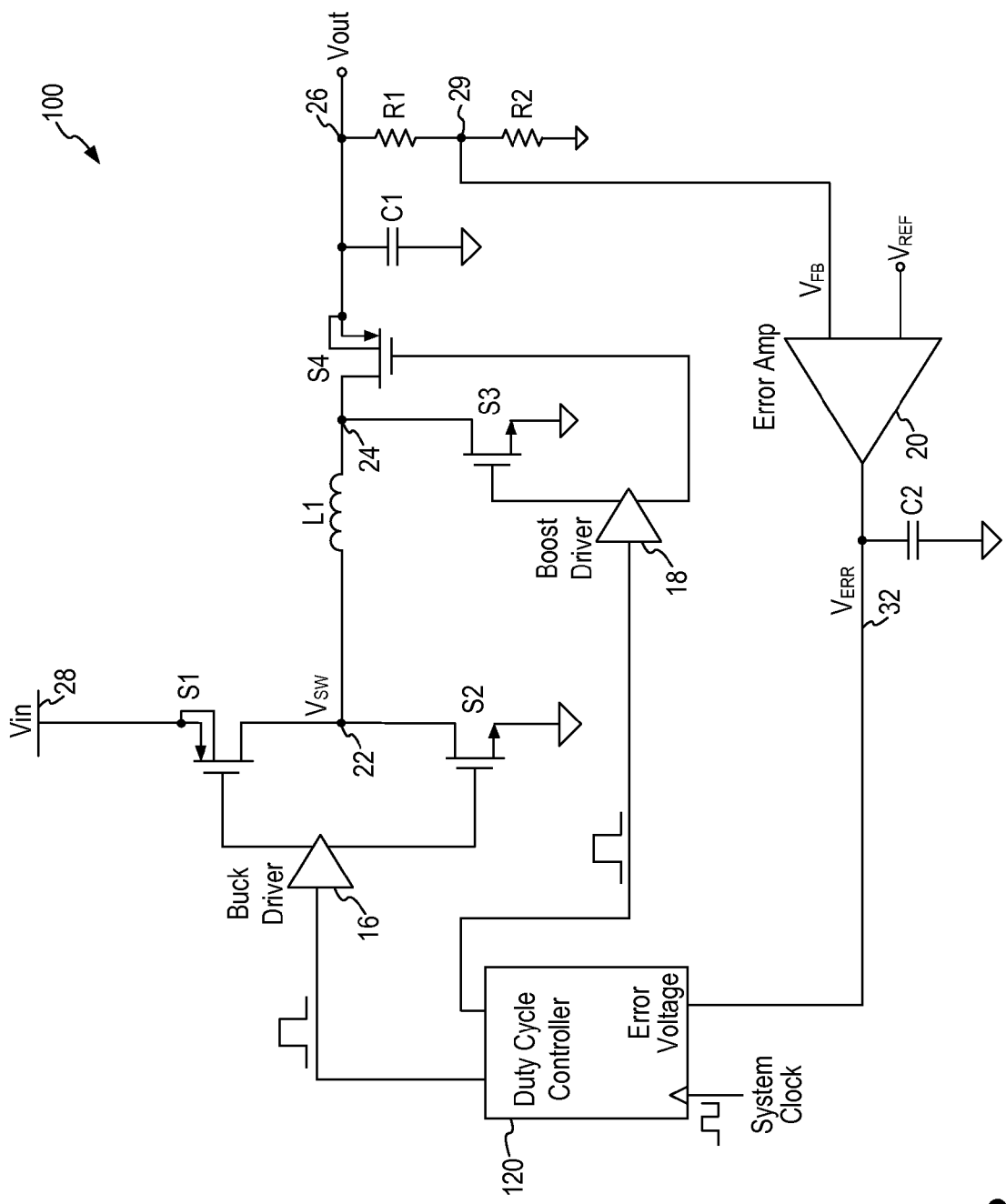
FIG. 3 is a schematic diagram of a buck-boost converter incorporating a duty cycle controller according to one embodiment of the present invention.

FIG. 3 is a schematic diagram of a buck-boost converter incorporating a duty cycle controller according to one embodiment of the present invention. Referring to FIG. 3, a buck-boost converter 100 includes a duty cycle controller circuit 120, power switches S1 and S2 for buck operation and power switches S3 and S4 for boost operation, an inductor L1, and an output capacitor C1. The buck-boost converter 100 receives an input voltage Vin on a node 28 and provides an output voltage Vout having a substantially constant magnitude on a node 26 for driving a load (not shown). A voltage divider circuit including resistors R1 and R2 divides down the output voltage Vout to provide a feedback voltage $V_{FB}$ (on node 29) to be fed back to the duty cycle controller circuit 120 to provide regulation and control of the output voltage. duty cycle controller circuit 120 may operate at a fixed switching frequency or a variable switching frequency.

More specifically, buck-boost converter 100 includes an error amplifier 20 for receiving the feedback voltage $V_{FB}$ and a reference voltage $V_{REF}$ and providing an error output voltage $V_{ERR}$ on a node 32 responsive to the difference between the feedback voltage and the reference voltage. A capacitor C2 may be used at the output node of the error amplifier 20 to filter the error output voltage. The error output voltage $V_{ERR}$ is processed by the duty cycle controller circuit 120 to derive the control signals for driving the power switches in either the buck mode or the boost mode or the buck-boost mode of operation. Error output voltage $V_{ERR}$ is used to determine the duty cycle of the power switches in the buck mode, the buck-boost mode, and the boost mode of operation. In the present embodiment, duty cycle controller circuit 120 generates control signals for controlling a buck driver circuit 16 for driving the buck power switches S1 and S2. Duty cycle controller circuit 120 also generates control signals for controlling a boost driver circuit 18 for driving the boost power switches S3 and S4.

More specifically, buck switches S1 and S2 are connected in series between the input voltage Vin and the ground potential to drive a switching output voltage $V_{SW}$ on a switching output node 22 to which inductor L1 is connected. Boost switches S3 and S4 are connected in series between the output voltage Vout and the ground potential to drive the other node 24 of the inductor L1.

The basic operation of buck-boost switching regulator 100 for providing a regulated output voltage Vout having a substantially constant magnitude is as follows. Duty cycle controller circuit 120 selects the buck, buck-boost or boost mode of operation depending on the input voltage Vin and the desired regulated output voltage Vout. When the input voltage is greater than the output voltage Vout, the buck mode is selected and the boost switch S4 is left on while the boost switch S3 is left off. The buck switches S1 and S2 are then synchronously switched by the pulses from duty cycle controller circuit 120 at specific duty cycles to regulate the output voltage at the desired level. In the buck mode, duty cycle controller circuit 120 drives the power switch S1 to turn on so that inductor L1 has the input voltage Vin impressed upon it and the current through the inductor builds up. At the end of the buck duty cycle, the duty cycle controller circuit 120 turns off power switch S1 and turns on power switch S2. The voltage across inductor L1 reverses and inductor L1 dumps energy through power switch S4 onto output capacitor C1.

When the input voltage is less than the output voltage Vout, the boost mode is selected and the buck S1 is left on while the buck switch S2 is left off. The boost switches S3 and S4 are then synchronously switched by the pulses from the duty cycle controller circuit 120 at specific duty cycles to regulate the output voltage at the desired level. In the boost mode, at the start of the duty cycle, the duty cycle controller circuit 120 turns on power switch S3 to direct the inductor current to ground. Then, the duty cycle controller circuit 120 drives the power switch S4 to turn on and drives power switch S3 to turn off so that the current from the input voltage Vin flows through the inductor L1 and power switch S4 to charge up output capacitor C1. The output voltage Vout is maintained by output capacitor C1 until the next cycle when power switch S3 is turned on again.

When the input voltage is nearly equal to the output voltage Vout, the buck-boost mode is selected where the buck switches S1, S2 and the boost switches S3 and S4 are synchronously switched by the pulses from the duty cycle controller circuit 120 at specific duty cycles to regulate the output voltage at the desired level. More specifically, in the buck-boost mode, the boost switch S3 is turned on for at least the minimum on-time at the start of the duty cycle while buck switch S1 is turned on. Then, at the end of the duty cycle, buck switch S2 is turned on for the recirculation period.

Figure 1:
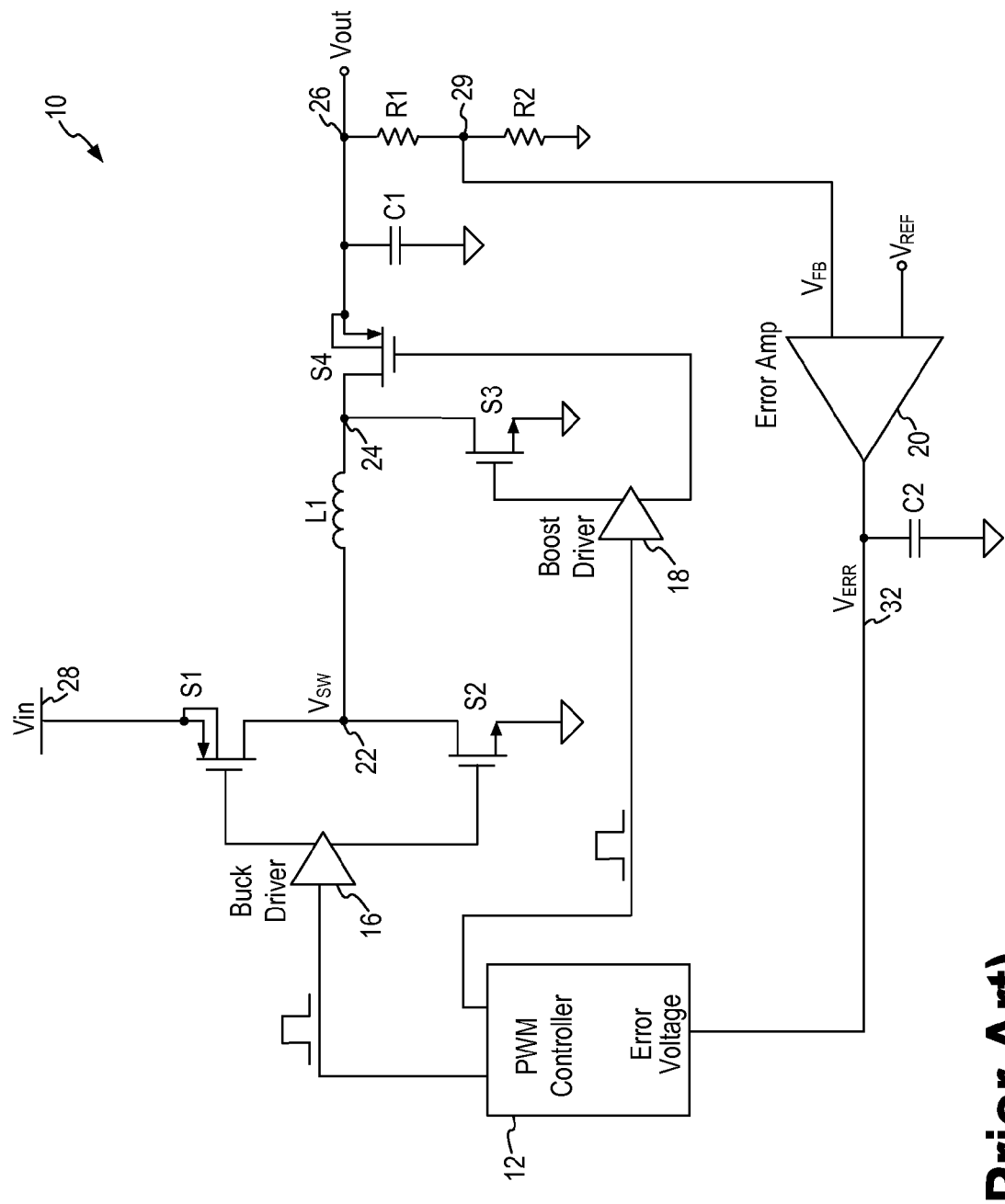
FIG. 1 is a schematic diagram of a conventional buck-boost converter.
Figure 2:
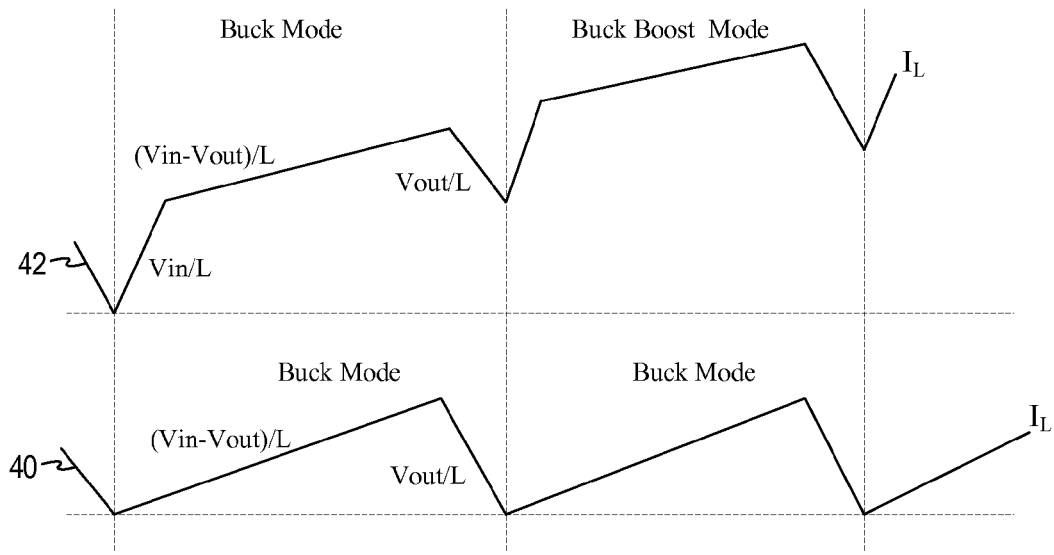
FIG. 2 illustrates the inductor current waveforms in the Buck Mode and the Buck-Boost Mode for the buck-boost converter of FIG. 1.
Figure 4:
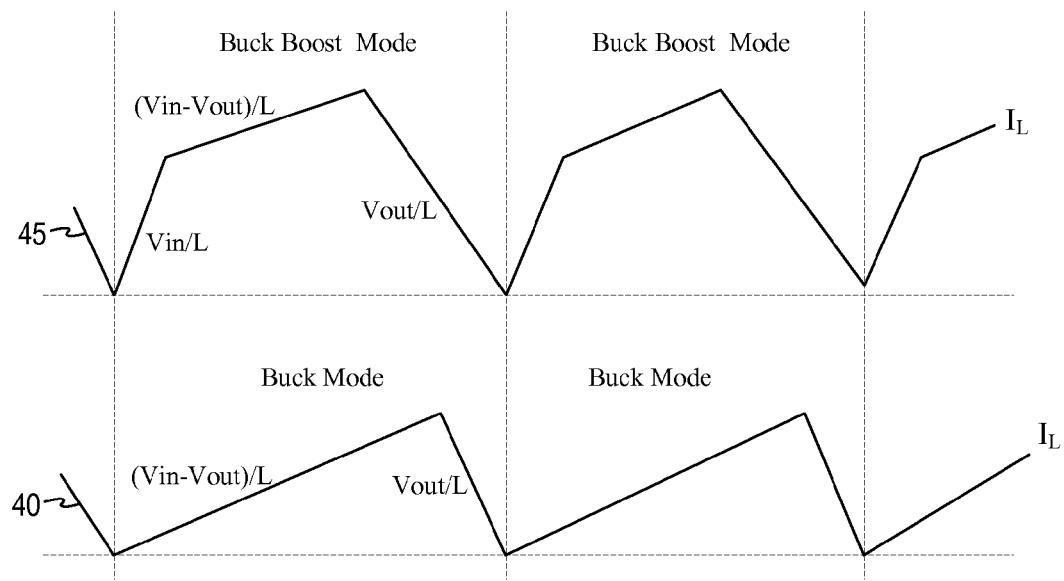
FIG. 4 illustrates the inductor current waveforms in the Buck Mode and the Buck-Boost Mode for the buck-boost converter of FIG. 3.
Figure 5:
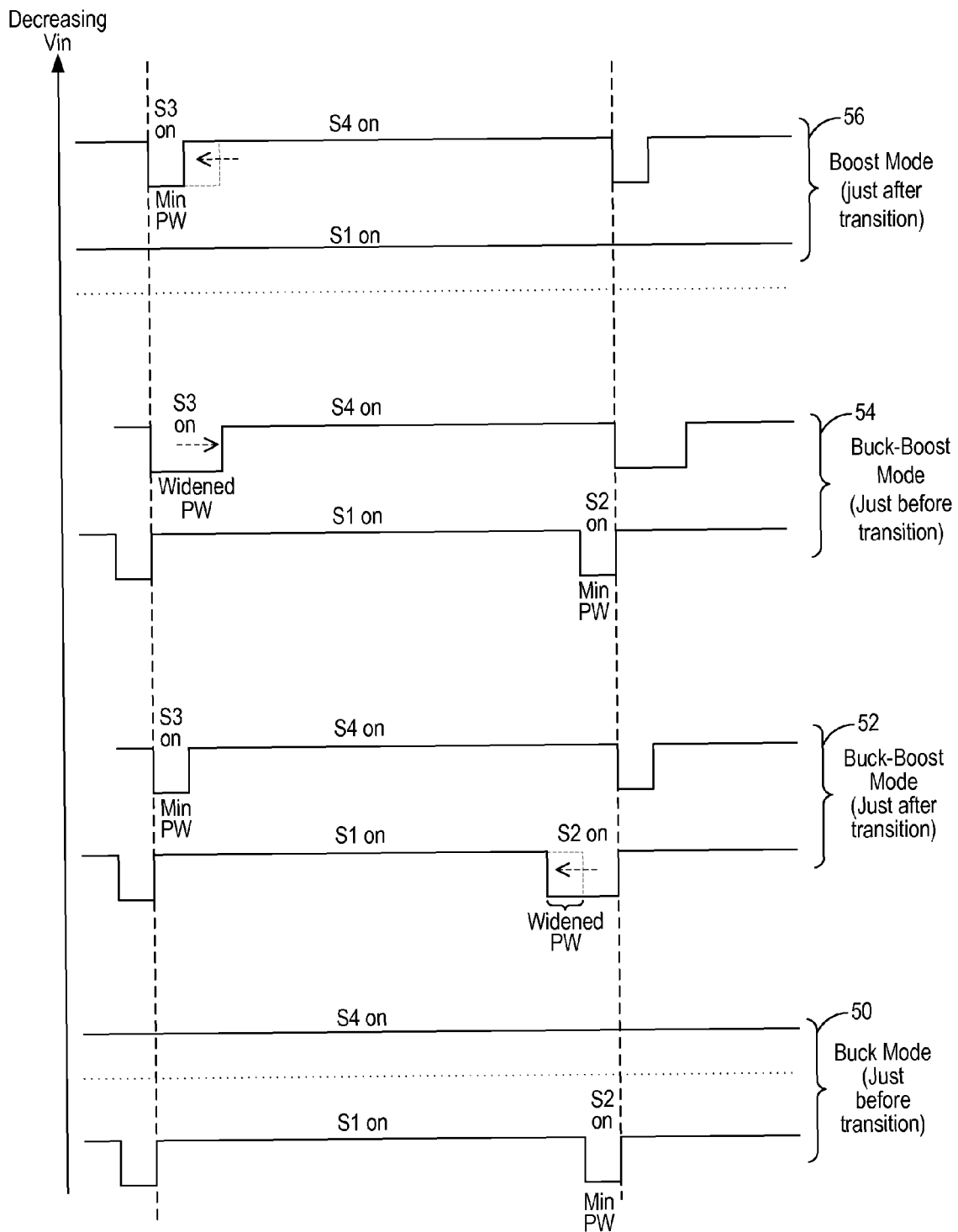
FIG. 5 is a timing diagram illustrating the states of the power switches during different operation modes according to one embodiment of the present invention.
Figure 6:
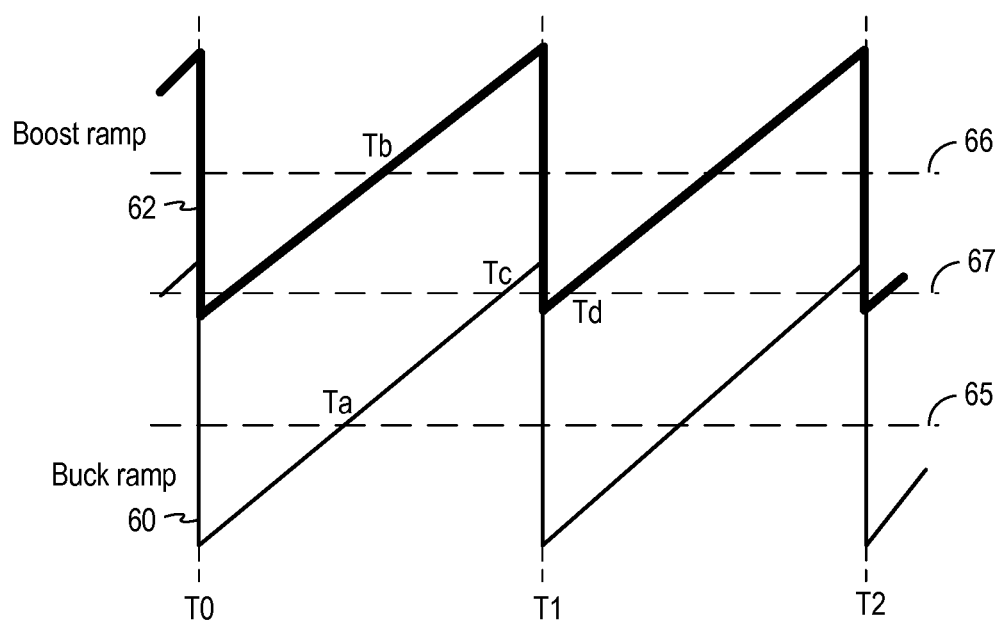
FIG. 6 illustrates offset buck and boost ramping waveforms and the control voltage levels which can be used to control the switching of the power switches according to one embodiment of the present invention.

As described above, if the buck-boost converter is operated in the conventional manner as described above, smooth transitions into and out of the Buck-Boost mode cannot be realized and chattering and transient jumping between operation modes can result. Also, the transitions between operation modes may result in glitches in the output voltage. According to embodiments of the present invention, the buck-boost converter 100 of the present invention implements the mode transition methods descried in the aforementioned '602 patent application. More specifically, the mode transition methods described in the '602 patent application control the buck and boost duty cycles to ensure stable transitions into and out of the buck-boost mode. The mode transition methods of the '602 patent application will be described with reference to FIGS. 4-6. FIG. 4 illustrates the inductor current waveforms in the Buck Mode and the Buck-Boost Mode for the buck-boost converter of FIG. 3. FIG. 5 is a timing diagram illustrating the states of the power switches during different operation modes according to one embodiment of the present invention. FIG. 6 illustrates offset buck and boost ramping waveforms and the control voltage levels which can be used to control the switching of the power switches according to one embodiment of the present invention. In FIG. 5, the on and off time of the power switches S1 to S4 with the input voltage Vin dropping is shown. When the input voltage Vin is greater than the output voltage Vout, the converter 100 is operated in the buck mode until the input voltage Vin drops to a level that is slightly higher than the output voltage Vout. At that point, the buck mode is operating at the maximum buck duty cycle where buck switch S2 is on for the minimum on time and the buck duty cycle is less than 100%, such as between 90% to 95% (waveform set 50 in FIG. 5).

Referring to FIGS. 4-6, in embodiments of the present invention, the duty cycle controller 120 controls the buck and boost duty cycles of the converter 100 so that when the converter 100 enters the buck-boost mode (waveform set 52 in FIG. 5) from the buck mode, the boost duty cycle begins with a minimum boost switch on-time or minimum boost switch pulse width and the buck recirculation pulse is increased by the minimum on-time of the boost switch, thereby decreasing the buck duty cycle. In other words, when the buck-boost converter 100 transitions to the buck-boost mode from the buck mode, boost switch S3 is turned on at the beginning of the cycle for the minimum on-time or minimum pulse width and the buck recirculation switch S2, which is normally turned on at minimum pulse width, is now turned on for the minimum pulse width plus the minimum pulse width of the boost switch. The buck duty cycle, the time which S1 is turned on, is thus decreased to decrease the buck duty cycle.

At the start of the buck-boost mode, the input voltage is nominally the same as the output voltage. Thus, the increased buck recirculation pulse width causes the inductor current to fall by about the same amount as the rise in inductor current caused by the boost pulse. Therefore, the inductor current at the beginning of a switching cycle will be about the same as at the end of the switching cycle (curve 45 in FIG. 4), and stable transition operation is ensured.

During the buck-boost mode, the boost switch S3 increases its duty cycle so that it is on longer than the minimum on-time. Meanwhile, the buck switch S2 on-time per cycle is reduced by the same amount so that the buck duty cycle is increased.

From the buck-boost mode, the converter 100 enters the boost mode when the input voltage drops below the output voltage. At that point, the buck switch S2 reaches the minimum pulse width (waveform set 54 in FIG. 5). Upon entering the boost mode, the buck recirculation pulse is stopped, that is, switch S2 is kept open, and the on-time of the boost switch S3 is immediately reduced by the same amount as the minimum on-time of the buck recirculation switch S2 (waveform set 56 in FIG. 5). In this manner, the inductor current at the end of the cycle can return to the same current level that was at the start of a cycle. During the boost mode, buck switch S1 is turned on while buck switch S2 remains off. The duty cycle controller 120 operates the boost switches S3 and S4 to control the boost duty cycle. Using the mode transition methods describes in the '602 patent application, the buck-boost converter 100 can operate with no increased ripple or oscillation during the transitions into and out of the buck-boost mode.

In embodiments of the present invention, the duty cycle controller 120 applies a buck ramping waveform 60 and a boost ramping waveform 62 (FIG. 6) to control the on-time of the power switches S1 to S4. In one embodiment, the error voltage $V_{ERR}$ (or other control voltage) is compared with the buck and boost ramping waveforms to determine the mode and the duty cycle of the converter. The duty cycle or the on-off times of the power switches may be compensated by applying offsets to the ramping waveforms or applying offsets to the error voltage or control voltage. The duty cycle controller 120 generates the control signals for driving the buck driver 16 and the boost driver 18 to control the duty cycles of the power switches S1 to S4.

The duty cycle generation using the buck and boost ramping waveforms 60, 62 for different error voltage or control voltage levels will now be described with reference to FIG. 6. Referring to FIG. 6, three different control voltage levels are shown as control voltages 65, 66, 67. The control voltages 65-67 may be the error voltage $V_{ERR}$ in converter 100 or may be a demand signal in a current controlled loop. The level of the control voltages determines the operation mode of the converter and the duty cycles of the power switches S1-S4. Within the buck-boost mode, the buck ramp waveform 60 and boost ramp waveform 62 are shown overlapping so that both the buck and boost switches are switched each cycle. The mode transition methods described herein apply to many different types of buck-boost converters using voltage control loops and/or current control loops. Thus, the control signal may represent an error voltage in a voltage loop or a current error in a current loop.

When the input voltage Vin is significantly higher than the output voltage, the error voltage $V_{ERR}$ will cause the demand signal to be low in order to keep the feedback voltage $V_{FB}$ equal to $V_{REF}$, and this will result in a lower overall average voltage demand across the inductor L1. An example of such a low demand signal is control voltage 65, which only intersects the buck ramp waveform 60 during some portion of the cycle. Accordingly, the converter 100 will operate in the buck mode. In the buck mode, the boost switch S4 will remain on, and the boost switch S3 will remain off. From time T0 to time Ta, the buck switch S1 is on and switch S2 is off. Between time Ta and T1, switch S2 is on and switch S1 is off. Accordingly, the buck ramp waveform 60 determines the buck duty cycle depending where on the ramp the control voltage intersects the waveform 60.

When the input voltage Vin is significantly lower than the output voltage, the error voltage $V_{ERR}$ will cause a higher demand signal or control signal to be generated in order to keep the feedback voltage $V_{FB}$ equal to $V_{REF}$. An example of such a high control signal is control voltage 66, which only intersects the boost ramp waveform 62 during some portion of the cycle. Accordingly, the converter 100 will operate in the boost mode. In the boost mode, the buck switch S1 will remain on, and the buck switch S2 will remain off. From time T0 to time Tb, the boost switch S3 is on and switch S4 is off. Between time Tb and T1, switch S4 is on and switch S3 is off. Accordingly, the boost ramp waveform 62 determines the boost duty cycle depending where on the ramp the control voltage intersects the waveform 62.

As the control voltage fluctuates during the buck and boost modes, such as when the input voltage changes, the duty cycles of the buck or boost switches will change to maintain the output voltage Vout at the regulated level. If the power supply is a battery, the control voltage increases as the battery voltage goes down, for a constant output voltage.

When the input voltage Vin is slightly above the output voltage, the error voltage $V_{ERR}$ will cause a nominal demand signal or control signal to be generated in order to keep the feedback voltage $V_{FB}$ equal to $V_{REF}$. An example of such a nominal control signal is control voltage 67, which intersects the overlapping portion of the buck and boost ramp waveforms. Accordingly, the converter 100 will operate in the buck-boost mode. In the buck-boost mode, from time T0 to time Tc, buck switch S1 is closed and switch S2 is open while boost switch S4 is closed and switch S3 is open. Between time Tc and T1, buck switch S1 is open and switch S2 is closed while boost switch S4 is closed and switch S3 is open. Between time T1 and Td, buck switch S1 is closed and switch S2 is open while boost switch S3 is closed and switch S4 is open. The boost pulse is thus added to the beginning of the cycle. Accordingly, the buck ramp waveform 60 and the boost ramp waveform 62 determine the duty cycle depending where on the ramps the control voltage intersects the waveforms 60, 62.

Figure 7:
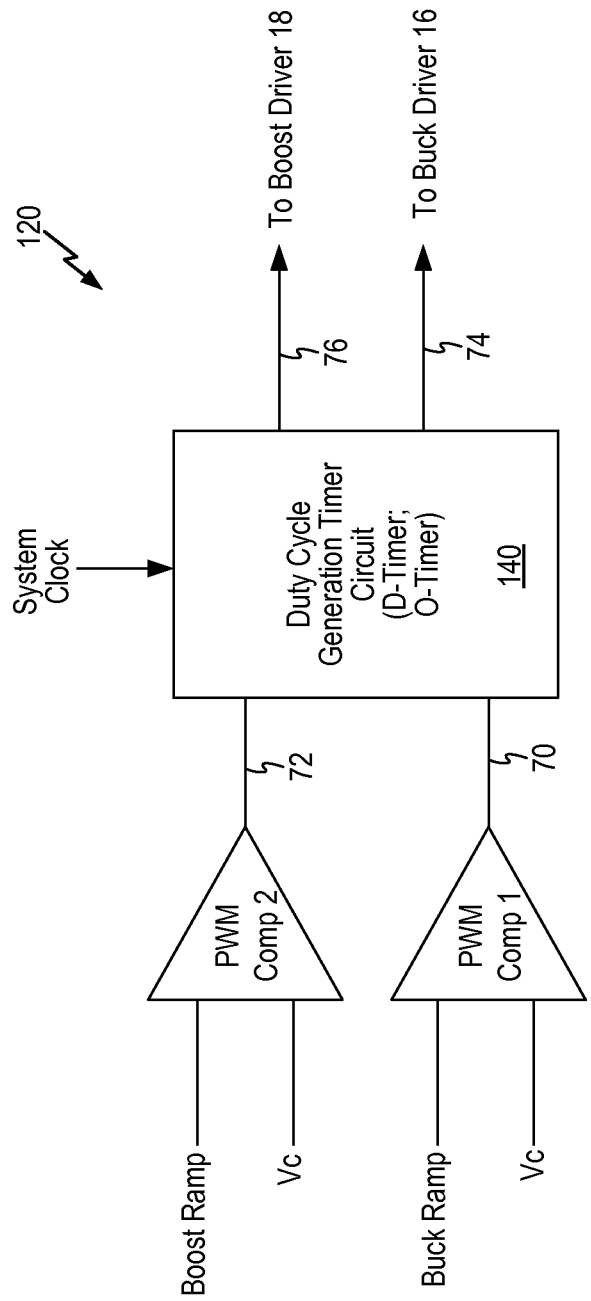
FIG. 7 is a schematic diagram of a duty cycle controller which can be incorporated in the buck-boost converter of FIG. 3 according to one embodiment of the present invention.

FIG. 7 is a schematic diagram of a duty cycle controller which can be incorporated in the buck-boost converter of FIG. 3 according to one embodiment of the present invention. Referring to FIG. 7, the duty cycle controller 120 receives the buck and boost ramp waveforms 60, 62 (FIG. 6) and a control voltage Vc, which may be the error voltage $V_{ERR}$ or other control voltage, as input signals. The duty cycle controller 120 generate control signals for driving the buck and boost drivers 16 and 18 to control the duty cycle of the power switches S1 to S4.

Duty cycle controller 120 includes a buck PWM comparator 1 and a boost PWM comparator 2 which operate to compare the control voltage Vc to respective buck and boost ramp waveforms. The PWM comparators 1 and 2 generate a first set of control signals on nodes 70, 72 indicative of the duty cycle for the buck switches (S1, S2) and for the boost switches (S3, S4).

According to one aspect of the present invention, the buck-boost converter 100 uses timers to control the transition between the buck, buck-boost and boost operation modes. Accordingly, duty cycle controller 120 includes a duty cycle generation timer circuit 140 configured to measure the duty cycle of the buck and boost power switches and to control the transition between the operation modes. Duty cycle generation timer circuit 140 receives the first set of control signals from the PWM comparators 1 and 2 and generate a second set of control signals on nodes 74, 76 for the buck driver 16 and the boost driver 18. Duty cycle generation timer circuit 140 is operative to control the transition between operation modes only. Thus, when the buck-boost converter 100 is operating in the buck mode or the boost mode, the duty cycle generation time circuit 140 do not modify the duty cycle of the control signals and the first set of signals effectively passes through the timer circuit as the second set of signals for the buck and boost drivers. However, the duty cycle generation timer circuit 140 operates to detect the boundary conditions when the converter should transition to another mode of operation and the duty cycle generation timer circuit 140 determines the duty cycle or on-off time for the power switches to ensure a stable transition between operation modes.

In embodiments of the present invention, duty cycle generation timer circuit 140 implements two types of timer values or "timers". First, a set of duty cycle timers, also referred to as "D-timers," is set to the minimum on/off time of the buck and boost power switches S1 to S4. The duty cycle timers, under worst case tolerance, meet the minimum on/off time specified for the power switches. In the present embodiment, the minimum on time and the minimum off time are assumed to be equal. In that case, a single duty cycle timer, or D-timer, represents both the minimum on and the minimum off time for the power switches.

Second, a set of offset timers, also referred to as "O-timers," is used to specify a buffer time to accommodate for implementation tolerance in transistor switch time, such as variations over temperature, clock skew, or comparator offset. The offset timers are selected to accommodate the worst case skew over process and temperature of the duty cycle generation errors. In one embodiment, a single offset timer, or O-timer, is used for transitions to and from buck-boost modes. In other embodiments, two or more offset timers may be used for different types of transitions, such as from buck-boost to buck mode or from buck-boost to boost mode.

Furthermore, the duty cycle generation timer circuit 140 further implements hysteresis to prevent the buck-boost converter from chattering between operation modes. In one embodiment, the hysteresis threshold is set as twice the offset timer. In other embodiments, the hysteresis threshold is set as N times the offset timer, N being a real number as N could be a division of the clock period.

In one embodiment, the duty cycle generation timer circuit 140 is implemented using a ring oscillator which can switch at a frequency faster than the switching frequency of the buck-boost converter. Furthermore, the ring oscillator may switch synchronously or asynchronously with the switching frequency of the buck-boost converter. In other embodiments, the duty cycle generation timer circuit 140 may be implemented using a phase-locked loop (PLL) where different timers can be generated as harmonics of the PLL.

In one embodiment, the duty cycle timers and offset timers are generated from the main oscillator or the system clock of the electronic device in which the buck-boost converter is incorporated. In the present embodiment, the system clock is synchronous with the switching frequency of the buck-boost converter. In other embodiments, the system clock may run at a frequency which is independent of the switching frequency of the buck-boost converter.

The duty cycle timers and the offset timers are used for two purposes. First, the duty cycle timers and the offset timers are used for duty cycle generation, that is, to determine the duty cycle to use for the power switches during the mode transition. Second, the duty cycle timers and the offset timers are used for threshold control, that is, to determine when the transition thresholds are met to enter or exit between the different operation modes. In embodiments of the present invention, the duty cycle generation timer circuit 140 digitally compares the buck and boost duty cycles to the transition threshold determined by the D-timers and the O-timers in order to determine the mode transition point. The duty cycle generation timer circuit 140 is thus able to perform near instant comparisons of the duty cycle versus the transition thresholds.

In one embodiment, the duty cycle controller implements a single duty cycle timer and a single offset timer. The duty cycle timer and the offset timer are used to specify the following transition thresholds:

| | |
|---|---|
| (1) Buck to Buck-Boost threshold: | $1 - (\text{D-timer} * f_s)$ |
| (2) Buck-Boost to Buck threshold: | $1 - ((\text{D-timer} + 2 * \text{O-timer}) * f_s)$ |
| (3) Buck-Boost to Boost threshold: | $1 + ((2 * \text{O-timer}) * f_s)$ | where $f_s$ denotes the switching frequency of the buck-boost converter from which the duty cycle timers and the offset timers are derived. In other embodiments, different duty cycle timers and different offset timers may be used for the different transition thresholds. For example, the O-timer used for the buck-boost to buck threshold may be different from the O-timer used for the buck-boost to boost threshold.

Accordingly, when the above transition threshold conditions are applied, the buck-boost converter 100 will transition from the buck mode to the buck-boost mode when the maximum buck duty cycle for the buck switch S1 is reached, as given by threshold condition (1) above. Once in buck-boost mode, the buck-boost converter 100 will transition back into the buck mode when the buck duty cycle (switch S1 duty cycle) decreases below the maximum with hysteresis, as given by threshold condition (2) above. Finally, once in buck-boost mode, the buck-boost converter 100 will transition to the boost mode when the buck duty cycle plus the boost duty cycle exceeds 100% with hysteresis, as given by threshold condition (3) above. More specifically, when time for which switch S1 is closed (buck duty cycle) to the time for which switch S3 is closed in the next cycle (boost duty cycle) is greater than 100% with hysteresis, the buck-boost converter 100 will transition to the boost mode. Another way to express the threshold condition (3) measuring the duty cycle of switch S3 (boost duty cycle) and when the boost duty cycle exceeds the hysteresis (two times the offset timer), then the buck-boost converter 100 will transition to the boost mode.

In one embodiment, assume that the system clock is running at $f_s$=4 MHz and the converter 100 has a worst case minimum on and off time of 25 ns, and an uncertainty of duty cycle generation of ±5 ns over process and temperature variations, then the D-timer would have a value of 25 ns, the O-timer would have a value of 5 ns (2%), and the hysteresis would be 10 ns (4%). Also, assume that the switching frequency of the converter is also at 4 MHz (250 ns period).

Based on the above-stated threshold conditions, the buck-boost converter 100 will go from the buck mode to the buck-boost mode when the buck duty cycle reaches 90% (or 225 ns on time for switch S1) being the maximum buck duty cycle. The minimum boost duty cycle is thus 10%. But when the converter is to transition back from the buck-boost to the buck mode, the duty cycle timer is buffered with hysteresis being two times the offset timer or 10 ns or 4% of the duty cycle. Thus, the buck duty cycle has to drop to 86% (or 215 ns on time for switch S1 before the converter will be allowed to transition back into the buck mode. When the converter is to transition from the buck-boost to the boost mode, the buck duty cycle plus the boost duty cycle exceeds the 100% duty cycle by the hysteresis (4%).

A salient feature of the duty cycle controller 120 of the present invention is that when the switching frequency is reduced, then the percentage duty cycle (and hence the operating range) for which the buck-boost mode operates reduces accordingly.

Table 1 below illustrates one exemplary embodiment of buck and boost duty cycle values for increasing control voltage at the mode transition boundary from the buck mode to the buck-boost mode. In the present illustration, the control voltage is indicative of the error voltage generated by the error amplifier comparing the feedback voltage of the buck-boost converter to a reference voltage. The above-described conditions for the buck-boost converter apply. That is, the switching frequency is 4 MHz, the maximum buck duty cycle is 90%, the minimum boost duty cycle is 10%, the offset timer is 5 ns or 2% and the hysteresis is 10 ns and 4%. The duty cycle controller of the present invention uses the duty cycle timers and the offset timers to determine the duty cycle at the transition point and also the threshold for making the transition.

| | Control Voltage | | | |
|---|---|---|---|---|
| | 0.43 V+ | 0.45 V | 0.45 V+ | 0.5 V |
| Buck Duty Cycle | 86% | 90% | 74% (−16%) | 84% |
| Boost Duty Cycle | 0% | 0% | 14% (+14%) | 24% |
| Operation Mode | Buck | Buck | Buck-Boost | Buck-Boost |

With the input voltage Vin greater than the output voltage, the buck-boost converter is operated in the buck mode. As the control voltage increases, the buck duty cycle increases until the maximum buck duty cycle of 90% is reached with the boost duty cycle at 0%. When the buck duty cycle reaches the transition threshold of 90% as measured by the duty cycle generation timer circuit, the buck-boost converter is about to enter the buck-boost mode. At this time, the recirculation pulse is at a minimum pulse width of 25ns or 10% duty cycle. At the transition point, the boost duty cycle is increased from 0% to 14% which is the 10% minimum duty cycle plus 4% hysteresis. Meanwhile, a 16% recirculation pulse is added which increases the recirculation pulse to 26% and decreases the buck duty cycle to 74%. In this embodiment, the recirculation pulse is increased by 2% more than the increase in the boost duty cycle. The additional 2% offset added to the recirculation pulse represents "overcooking" of the compensation to ensure stability in the transition. In the buck-boost mode, as the control voltage continues to increase (and the input voltage continues to decrease), the boost duty cycle and the buck duty cycle both increase from the value at the transition point.

Table 2 below illustrates one exemplary embodiment of buck and boost duty cycle values for increasing control voltage at the mode transition boundary from the buck-boost mode to the boost mode. The above-described conditions for the buck-boost converter apply.

|  | Control Voltage | | | |
| --- | --- | --- | --- | --- |
|  | 0.5 V+ | 0.52 V | 0.52 V+ | 0.875 V |
| Buck Duty Cycle | 84% | 88% | 100% (+12%) | 100% |
| Boost Duty Cycle | 24% | 28% | 14% (−14%) | 75% |
| Operation Mode | Buck-Boost | Buck-Boost | Boost | Boost |

With the control voltage increasing and the input voltage decreasing to be less than the output voltage, the buck-boost converter transitions to the boost mode. When the buck duty cycle reaches 88% and the recirculation duty cycle at 12% which is the minimum duty cycle plus the 2% offset and the boost pulse is at 28% duty cycle, the converter is about to leave the buck-boost mode and enter the boost mode. At the transition point, the buck duty cycle is increased by 12% to 100% which eliminated the recirculation pulse. Meanwhile, the boost duty cycle is decreased by 14% down to 14%. The boost duty cycle is decreased 2% more than the increase in the buck duty cycle (or the removal of the recirculation pulse) to realize a 2% offset. The additional 2% offset reduction in the boost pulse represents "overcooking" of the compensation to ensure stability in the transition.

In the reverse direction, hysteresis is applied to prevent chattering between operation modes. For instance, when the buck-boost converter is operated in the boost mode and the input voltage increases, the buck-boost converter is to transition to the buck-boost mode. At the transition boundary, the buck duty cycle is 100% (no recirculation pulse) while the boost duty cycle is at 10%, the minimum duty cycle. At the transition point, the buck duty cycle is decreased by 12% to 88% in order to add the recirculation pulse while the boost duty cycle is increased by 14% to 24%. The boost duty cycle is increased by 2% offset more than the reduction in the buck duty cycle to ensure stability.

Then, when the buck-boost converter is operated in the buck-boost mode and the input voltage continue to increase, the buck-boost converter is to transition to the buck mode. At the transition boundary, the buck duty cycle is 74% (26% recirculation pulse) while the boost duty cycle is at 10%, the minimum duty cycle. At the transition point, the buck duty cycle is increased by 12% to 86% while the boost duty cycle is decreased by 10% to 0%. The buck duty cycle is increased by 2% offset more than the reduction in the boost duty cycle to ensure stability.

The above detailed descriptions are provided to illustrate specific embodiments of the present invention and are not intended to be limiting. Numerous modifications and variations within the scope of the present invention are possible. The present invention is defined by the appended claims.

We claim:

1. A DC-to-DC, buck-boost voltage converter, the converter comprising a first buck switching transistor coupled between an input voltage and a first terminal of an inductor, a second buck switching transistor coupled between the first terminal of the inductor and ground, a first boost switching transistor coupled between a second terminal of the inductor and ground, and a second boost switching transistor coupled between the second terminal of the inductor and an output terminal of the converter, the converter comprising:

a duty cycle controller configured to generate control signals for a buck driver configured to drive the first and second buck switching transistors at a buck duty cycle and to generate control signals for a boost driver configured to drive the first and second boost switching transistors at a boost duty cycle, the duty cycle controller comprising at least a duty cycle timer value and an offset timer value, wherein the duty cycle controller uses the duty cycle timer value and the offset timer value to establish one or more transition thresholds to control transitions between the buck, the buck-boost and the boost operation modes of the voltage converter, wherein the duty cycle timer value is indicative of a minimum on time or a minimum off time of the buck and boost switching transistors, and the offset timer value is indicative of variations and tolerance in the transistor switch time over temperature and process variations; and wherein the duty cycle controller is configured to measure the buck duty cycle and the boost duty cycle, and to digitally compare the buck duty cycle and the boost duty cycle to the one or more transition thresholds to control the transitions between the buck, the buck-boost and the boost operation modes of the voltage converter.

2. The buck-boost voltage converter of claim 1, wherein the duty cycle controller further comprises a hysteresis threshold being N times the offset timer value, N being a positive number.

3. The buck-boost voltage converter of claim 1, wherein the duty cycle controller comprises a phase-locked loop (PLL) to generate the duty cycle timer value and the offset timer value as harmonics of the PLL.

4. The buck-boost voltage converter of claim 1, wherein when entering into the buck-boost mode from the buck mode, the duty cycle controller reduces the duty cycle of the first buck switching transistor to increase an on-time of the second buck switching transistor to compensate for the first boost switching transistor having a minimum on- time at a start of the buck-boost mode of operation.

5. The buck-boost voltage converter of claim 1, wherein when entering into the boost mode from the buck-boost mode, the duty cycle controller decreases the duty cycle of the first boost switching transistor to compensate for the first buck switching transistor stopping switching at a start of the boost mode of operation, where the first buck switching transistor has a minimum on-time prior to the converter entering the boost mode.

6. The buck-boost voltage converter of claim 1, wherein the duty cycle controller uses the duty cycle timer value and the offset timer value to establish a first transition threshold for transitioning from the buck mode to the buck-boost mode, a second transition threshold for transitioning from the buck-boost mode to the buck mode, and a third transition threshold for transitioning from the buck-boost mode to the boost mode.

7. The buck-boost voltage converter of claim 6, wherein the first transition threshold comprises the maximum buck duty cycle reaching $1-(\text{D timer}*f_s)$, where D-timer is the duty cycle timer value and $f_s$ denotes the switching frequency of the voltage converter.

8. The buck-boost voltage converter of claim 6, wherein the second transition threshold comprises the maximum buck duty cycle decreasing below $1-(\text{D-timer}+2*\text{O-timer})*f_s)$, where D-timer is the duty cycle timer value, the O-timer is the offset timer value and $f_s$ denotes the switching frequency of the voltage converter.

9. The buck-boost voltage converter of claim 6, wherein the third transition threshold comprises the sum of the buck duty cycle and the boost duty cycle reaching $1+((2*\text{O-timer})f_s)$, where D-timer is the duty cycle timer value, the O-timer is the offset timer value and $f_s$ denotes the switching frequency of the voltage converter.

10. The buck-boost voltage converter of claim 6, wherein the duty cycle controller digitally compares the buck duty cycle and the boost duty cycle to the first, second and third transition thresholds to control the transitions between the buck, the buck-boost and the boost operation modes of the voltage converter.

11. The buck-boost voltage converter of claim 1, wherein the duty cycle controller comprises one or more ring oscillators to generate the duty cycle timer value and the offset timer value.

12. The buck-boost voltage converter of claim 11, wherein the one or more ring oscillators has a frequency higher than a switching frequency of the voltage converter.

13. The buck-boost voltage converter of claim 11, wherein the one or more ring oscillators has a frequency being synchronous to a switching frequency of the voltage converter.

14. The buck-boost voltage converter of claim 11, wherein the one or more ring oscillators has a frequency being asynchronous to a switching frequency of the voltage converter.

* * * * *